United States Patent [19]
Gardes

[11] Patent Number: 5,863,283
[45] Date of Patent: Jan. 26, 1999

[54] SYSTEM AND PROCESS FOR DISPOSING OF NUCLEAR AND OTHER HAZARDOUS WASTES IN BOREHOLES

[76] Inventor: Robert Gardes, P.O. Box 92593, Lafayette, La. 70509

[21] Appl. No.: 798,479

[22] Filed: Feb. 10, 1997

[51] Int. Cl.[6] .............. B09B 1/00; E21B 36/00; G21F 9/00
[52] U.S. Cl. .............. 588/250; 166/50; 166/290; 166/302; 405/128; 588/17; 588/258; 588/259
[58] Field of Search .............. 166/50, 57, 242.1, 166/285, 290, 292, 302; 405/128; 588/17, 250, 257, 258, 259

[56] References Cited

U.S. PATENT DOCUMENTS

| | | | |
|---|---|---|---|
| 3,513,100 | 5/1970 | Stogner | 405/128 X |
| 4,316,814 | 2/1982 | Verpmann | 588/17 |
| 4,452,478 | 6/1984 | Dulaney | 405/128 X |
| 4,586,849 | 5/1986 | Hastings | 405/128 |
| 4,861,194 | 8/1989 | Lang | 405/128 |
| 4,877,353 | 10/1989 | Wisotsky, Sr. | 405/128 |
| 5,191,156 | 3/1993 | Jorgensen et al. | 588/249 |
| 5,202,522 | 4/1993 | Williams | 588/250 |
| 5,314,265 | 5/1994 | Perkins et al. | 405/128 |
| 5,338,493 | 8/1994 | Welch | 588/17 X |
| 5,463,164 | 10/1995 | Perkins | 588/250 |
| 5,489,739 | 2/1996 | Curry et al. | 588/250 |
| 5,536,115 | 7/1996 | Keck | 405/128 |

Primary Examiner—George Suchfield
Attorney, Agent, or Firm—Garvey, Smith, Nehrbass & Doody, L.L.C.

[57] ABSTRACT

A system for disposing of hazardous waste, such as nuclear waste, underground which provides the drilling of a wellbore down into a level of a underground bed of salt, for example, and forming a horizontal borehole through the salt bed next, drilling a plurality of radial wells off of the horizontal well to a predetermined length of each radial well extending outward from the horizontal wellbore; lowering a quantity of nuclear wastes contained within a specially designed pre-packed liner at the end of a drill string, into each of the radial wells drilled off of the horizontal wellbore; providing a packer at the entrance to each of the radial wells for packing off the borehole of each of the radial wells to completely isolate the nuclear wastes within the radial wellbore; retrieving the drillstring from the horizontal wellbore; cementing the entire length of the horizontal wellbore so as to further isolate each of the radial wells containing the spent nuclear waste; and capping off the vertical wellbore on the surface so as to provide a fully sealed nuclear waste disposal facility with nuclear wastes disposed ir each of the radial wellbores, each of the bores sealed off from one another.

34 Claims, 9 Drawing Sheets

SYSTEM AND PROCESS FOR DISPOSING OF NUCLEAR AND OTHER HAZARDOUS WASTES IN BOREHOLES

CROSS-REFERENCE TO RELATED APPUCATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to disposing of hazardous waste underground. The method and system of the present invention could also be utilized for disposing of other hazardous waste such as chemical warfare waste, biomedical waste, or the like. More particularly, the present invention relates to a system and a method for safely disposing spent nuclear wastes at various depths underground through the use of a horizontal borehole or a plurality of radial boreholes drilled off of a horizontal borehole, utilizing a two drillstring technique, with the nuclear wastes sealed therein at a safe distance below the surface of the earth beyond any water sands or permeable formations.

2. General Background of the Invention

One of the more prevalent problems that is being addressed in the twentieth century and will need to be continued addressed even on a larger scale in the twenty first century, is the problem of nuclear wastes, such as spent nuclear waste from nuclear plants and the like. At the present time, the single manner in which the threat of nuclear wastes is addressed is through storage of the wastes. To now, there has been no attempt to safely dispose of nuclear wastes.

The most serious problem is the type of spent nuclear wastes which are generated as a waste product from the operation of nuclear facilities, more particularly, nuclear plants which generate electrical power. Such nuclear plants are located throughout the world, and every nation in which the plants are located must eventually address the problem of safely disposing the waste product from these plants in such a manner that is not harmful to the surrounding environment either at the present or for future generations. Storage of wastes will become prohibitively expensive and difficult to continue.

One method that has evolved in the storing of nuclear wastes is placing the nuclear wastes in containers, such as sealed drums, and storing the drums within salt caverns below the surface of the earth. This is a quite popular means of storing nuclear wastes in view of the fact that salt (NaCl) has a "self-sealing" trait, so that if there is a potential leak, and a container housing the wastes is surrounded by salt, then the salt would tend to form a natural seal at the leak and help prevent further leakage. However, one of the problems that occur in the storage of nuclear wastes within salt caverns is that the caverns are normally located at quite shallow depths, sometimes between one to three thousand feet and are usually approximately 100–200 feet in thickness. If there is inadvertent leakage at this shallow depth, there is a potential of contaminating the water table in that region. This method, again, is addressing storage of the nuclear wastes, not disposal of the wastes, and would require constant monitoring, and construction of expensive facilities to house the nuclear wastes.

There have been alternative methods which have been attempted for storage of nuclear wastes further beneath the earth's surface. Such methods include the construction of storage facilities far beneath the surface of the earth, for example through a series of underground mines which may store tons of radioactive nuclear waste. However, one can well imagine that when such a storage facility is constructed, the billions of dollars of expense that is incurred in the construction of such underground waste storage facilities. Most of these facilities are constructed so that the underground tunnels are able to accommodate even vehicles such as trucks for transporting the nuclear wastes thousands of feet under the ground and the storage mines are of sufficient size so as to allow these vehicles to traverse through the mines for the placement of the waste and storage. Of course, these mines must be carefully constructed and supported so that should there be an inadvertent leak of the waste in these mines, that the mines are self-contained and leakage into the surrounding environment of the radioactive wastes is avoided.

Even in the event such underground mines are constructed at the enormous costs, further enormous costs are incurred in the continued maintenance and monitoring of the underground mines during the time period that the nuclear wastes are stored. This would normally require a substantial amount of manpower and hardware in order to monitor the status of the waste, not to mention the cost of maintaining the facility itself in order to maintain it in its completely upgraded state.

However, because of the nature of the wastes, most of the methods for dealing with nuclear wastes generated by a plant or the like, result in the wastes being stored on site, and are never really disposed of. The problem of disposal has not yet been properly solved. Therefore, there is a need in the art for a process or a system for not only storing nuclear wastes, but of finally disposing of the wastes, which would provide a vast, yet safe disposal area that could receive the wastes, and would require no continuous monitoring or maintenance.

Another serious problem which needs to be addressed is the disposal of waste which are stockpiling in the environment as a result of weapons filled with deadly chemicals which may have been designed for use in warfare, and which because of their deadly nature, cannot be stored for any great length of time and must be properly disposed of. Additionally, other waste in the environment such as biological waste which again cannot be simply stored in a safe manner should be disposed of within a setting which guarantees its complete isolation from the environment.

BRIEF SUMMARY OF THE INVENTION

The system and process of the present invention solves the shortcomings in the art in a simple and straightforward manner. What is provided is a system for disposing of nuclear wastes or other types of hazardous wastes in an underground salt bed, in particular, spent nuclear wastes, which provides drilling a borehole having a first portion drilled to a certain depth within the salt bed or other non-permeable formation; at least a second portion of the borehole angularly extending from the first portion a predetermined distance from the first portion of the borehole within the salt bed; a sealed liner containing a quantity of nuclear wastes deposited into the second portion of the borehole; and sealing off the second portion of the borehole containing the nuclear wastes within the salt bed from the first portion of the borehole.

In other particulars of the system, a method is undertaken wherein a principal wellbore is drilled down into a level of an underground salt bed, or other non-permeable formation, for example; a first horizontal borehole is drilled into the salt bed; next, a second plurality of radial wells off of the horizontal well are drilled to a predetermined distance extending outward from the horizontal wellbore utilizing a two-string technique; a quantity of nuclear material contained within a specially designed pre-packed liner at the end of a drill string is lowered into each of the radial wells drilled off of the horizontal wellbore; providing a packer at the entrance to each of the radial wells for packing off the borehole of each of the radial wells to completely isolate the nuclear wastes within the radial wellbores; retrieving the drillstring from the horizontal wellbore; cementing the entire length of the horizontal wellbore so as to further isolate each of the radial wells containing the spent nuclear waste; and capping off the vertical wellbore on the surface so as to provide a fully sealed nuclear waste disposal facility with nuclear wastes disposed in each of the radial wellbores, each of the bores sealed off from one another.

Yet, other particulars may involve a method of disposing of nuclear wastes down a borehole which would involve a technique known as a dual string technique. In a dual string technique, the first step would involve drilling a principal wellbore which may be either vertical or horizontal; casing the wellbore and cementing the casing, which may be a combination of steel and/or fiberglass; lowering a carrier string having an upstock on its lower end into the principal wellbore to a predetermined depth; orienting the carrier string in a proper direction; lowering an inner drillstring into the carrier string, whereupon reaching the upstock which is oriented in the same direction as the drill string, drilling is commenced, and a window is milled thereby drilling a radial wellbore; upon completion of the drilling of the radial wellbore, removing the drilling assembly from the wellbore while maintaining the carrier string with the upstock in position at the radial wellbore; securing a sealed quantity of nuclear waste onto a running housing with the running housing having a bore therethrough, and lowering the running housing into the carrier string so that when the sealed nuclear waste makes contact with the angulated surface of the upstock, it is directed into the radial wellbore. During this process, the nuclear waste are maintained or cooled in the following manner. There is a first fluid such as water flowed down the bore of the running string, flowing a second fluid down the borehole in the annulus between the running string and the carrier string as the secondary cooling fluid; merging the fluids at the base of the carrier string and returning the merged fluids up the annulus between the carrier string and the well casing; setting the nuclear waste within the radial borehole by inflating a sealing packer for isolating the radial borehole containing the nuclear waste from the first borehole; and cementing the second borehole up to a certain point so as to isolate the nuclear waste from the earth's Therefore, it is a principal object of the present invention to provide a process for safely disposing of nuclear wastes or other types of hazardous wastes such as chemical warfare weapons and biological wastes, so that the wastes are disposed within a lower portion of a borehole which is drilled horizontally from a first portion of the borehole in the process;

It is a further object of the present invention to provide a safe process for disposing of spent nuclear wastes beneath the surface of the earth by placing the nuclear wastes in a disposal liner having a hydrostatic pressure seal; placing the liner in a radial borehole and packing off the radial borehole and further packing off the horizontal well or cementing off the horizontal well from each of the radial boreholes extend from;

It is a further object of the present invention to provide a system for disposing of nuclear wastes which can be in such a manner that the nuclear wastes can be deposited at any depth below the surface of the earth, and the nuclear wastes can be sealed off in separate isolated quantities in individual radial boreholes;

It is a further object of the present invention to provide a system for disposing of spent nuclear wastes beneath the surface of the earth which is relatively inexpensive in construction, has a low maintenance factor, and is otherwise completely safer than the existing systems;

It is a further object of the present invention to provide a system and a method of disposing of nuclear wastes underground in a process which allows the wastes to remain cool during disposal downhole, by circulating fluid downhole as the wastes are lowered into the area for disposal; and It is a further object of the present invention to utilize either a single drilling or dual-string drilling technique in disposal of nuclear wastes down a horizontal borehole, or a series of boreholes radiating out from a principal borehole, and sealing the borehole in the salt bed.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
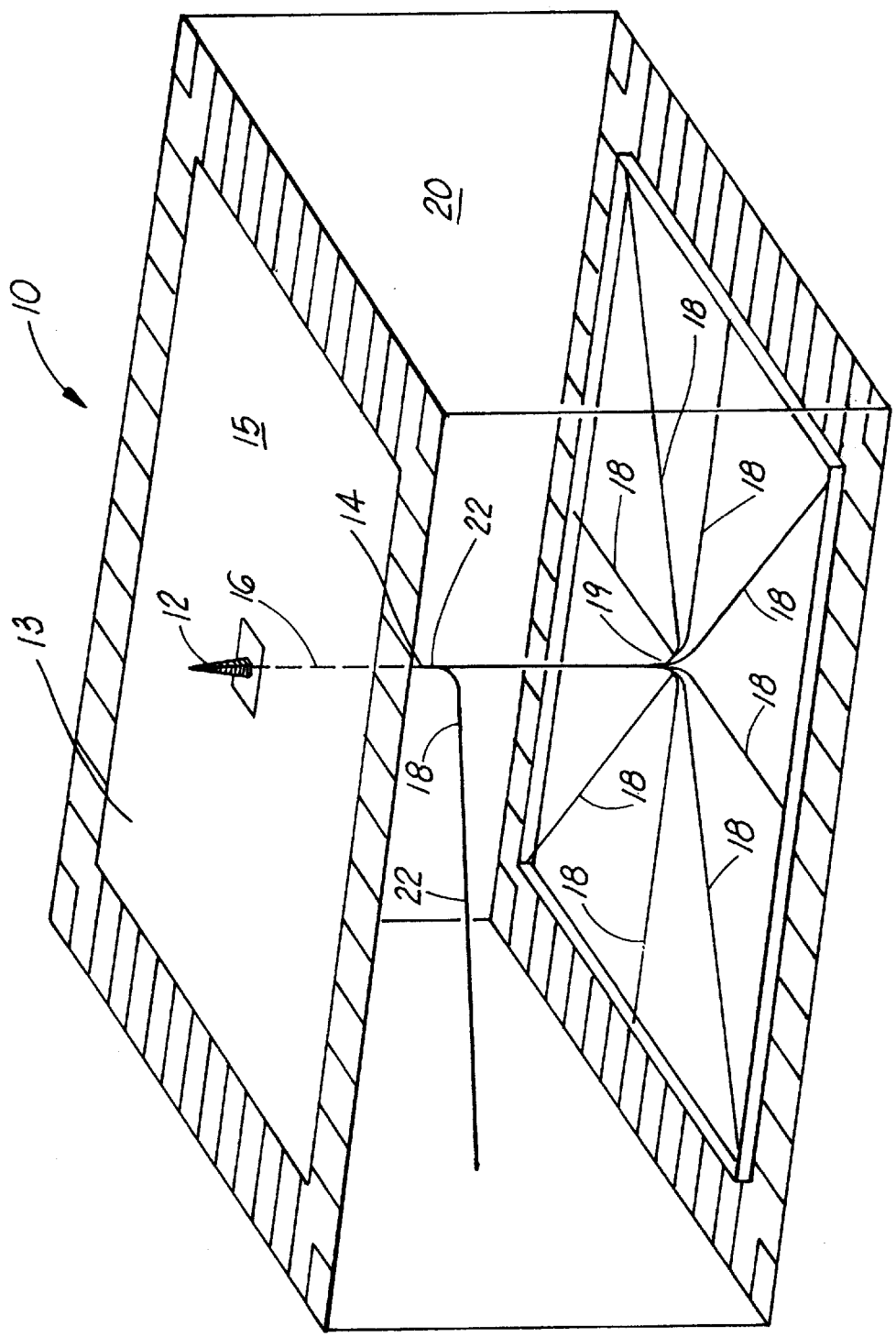
FIG. 1 is an overall view of a single horizontal borehole drilled off of a vertical wellbore, followed by a plurality of radial wellbores extending from the vertical well.

FIGS. 1–5 illustrate the preferred embodiment of the process and system of the present invention for disposal of nuclear wastes down a borehole. It is foreseen that there are several techniques which may be utilized in carrying on the present invention, and the types of boreholes which may be the site for such disposal of waste. For example, as illustrated in overall view in FIG. 1, in this embodiment, the system 10 would comprise in general a drilling rig 12 positioned on the surface 13 of the earth 15 which would be a typical type of drilling rig for allowing the drilling of vertical boreholes. As illustrated, there is a vertical borehole 14 which has been drilled from the drilling rig 12 which as in the normal case would use a plurality of sections of drill pipe forming the vertical borehole 14, so that if the vertical borehole is drilled, the borehole is lined with steel casing 16, again which is made up of a plurality of lengths of steel pipe joined end to end through threadably engaging thereto. As seen further in FIG. 1, vertical borehole 14 lined with steel casing 16 there has been provided a first horizontal borehole 18. Horizontal borehole 18 is the type which would be undertaken by utilizing steerable drilling systems used in the art of oil and gas horizontal drilling. A retrievable whipstock, upstock, or the like apparatus is lowered into the vertical wellbore 14 to a predetermined depth. The whipstock or upstock 44 is then oriented in proper direction. An inner drillstring is lowered into the first drill string having the upstock, and drilling commences with a motor driven drill bit downhole. The bit is deflected off of the guide surface of the upstock, and a window is milled out of the casing wall. The horizontal drill hole would be drilled through known techniques, in a proper orientation both vertically and horizontally, so as to effect a continuous horizontal borehole for a predetermined distance.

As illustrated further in FIG. 1, the horizontal drill hole is bored from the vertical borehole 14 into a salt bed 20 which has been detected at a certain depth beneath the surface of the earth, and is of a predetermined known thickness and configuration downhole, by known 3-D seismographic techniques. In any case, the salt bed 20 must be of sufficient thickness and size so that the horizontal borehole 18 would substantially run within the layer of salt and be surrounding by the underground salt bed. In this technique of drilling a horizontal well off of the vertical borehole 14, if the vertical borehole 14 is cased, which in all likelihood it would be, at the depth at which the horizontal borehole 18 is drilled through the casing, a section of fiberglass casing 22 may be utilized in order to more easily mill out the window in the wall of the fiberglass casing 22 from which the horizontal borehole would be drilled. As further illustrated in FIG. 1, following the drilling of the single horizontal borehole 18, the vertical borehole 14 which has previously been continued downward within salt bed 20, and at point 19, a plurality of horizontal boreholes 18 are drilled radiating outward from the single vertical wellbore 14, all contained within salt bed 20, utilizing the same techniques as described above. In this particular configuration, in theory, although there is but a single upper horizontal borehole 18 drilled into the salt bed, and a plurality of horizonal boreholes 18 drilled below the single borehole 18, the horizontal boreholes 18 could be utilized as the sites for disposing of the nuclear wastes, as will be discussed below utilizing the process and system of the present invention.

Figure 2:
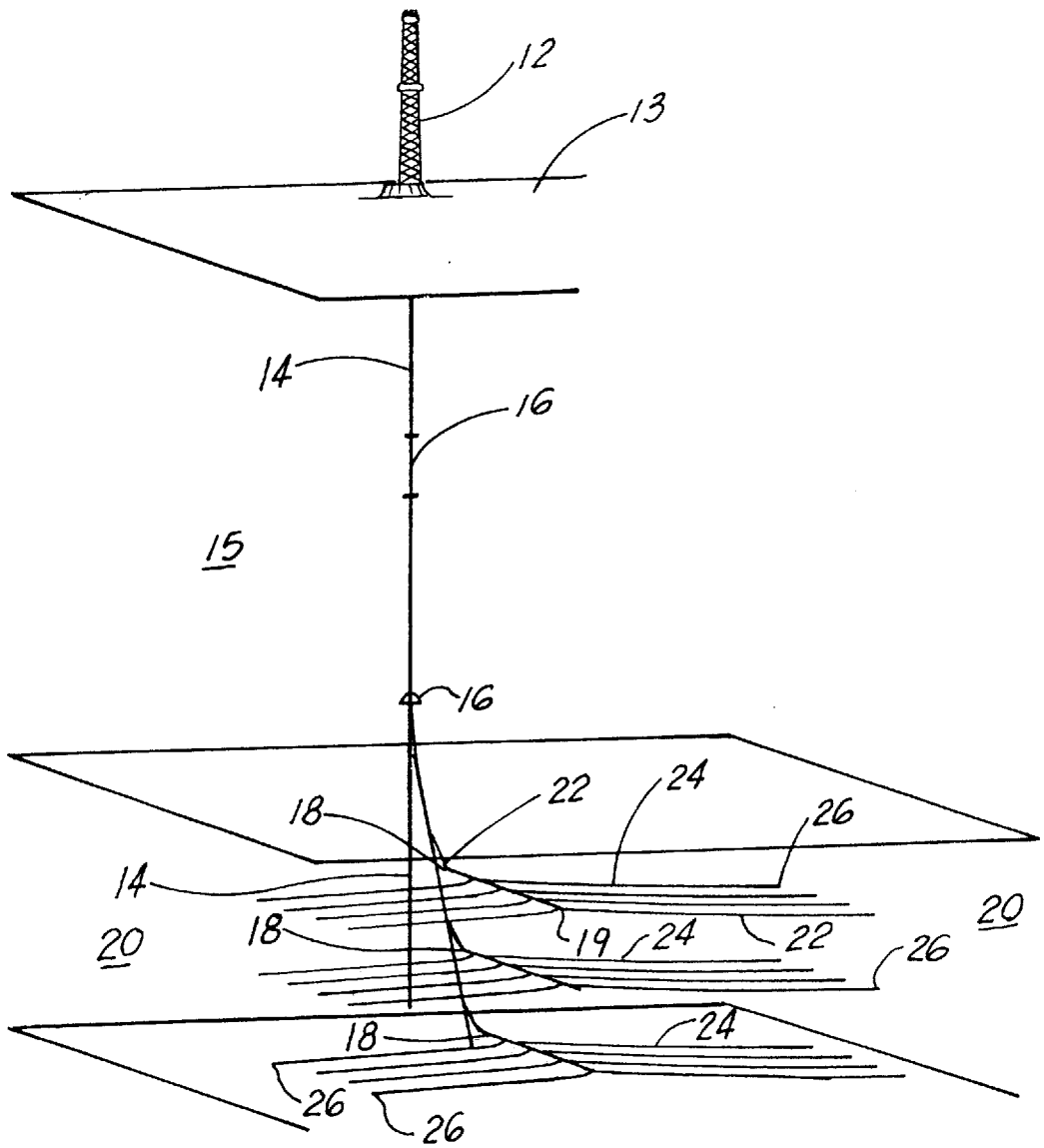
FIG. 2 is an overall view of a plurality of radial boreholes drilled off of a plurality of horizontal wells extending from a vertical well.

Next, reference is made to FIG. 2, where the system 10 again would comprise in general a drilling rig 12 positioned on the surface 13 of the earth 15 which would be atypical type of drilling rig for allowing the drilling of vertical boreholes. As illustrated, vertical borehole 14 has been drilled from the drilling rig which as in the normal case would use a plurality of sections of drill pipe forming the vertical borehole 14, so that if the vertical borehole is drilled, the borehole is lined with a lining of a steel casing 16, again which is made up of a plurality of lengths of steel pipe joined end to end through threadably engaging thereto. As seen further in FIG. 2, vertical borehole 14 lined with steel casing 16 there has been provided a first horizontal borehole 18.

Again, as described in FIG. 1, horizontal borehole 18 is the type which would be drilled utilizing a steerable horizontal drilling system, as in the type used in oil and gas horizontal drilling. The horizontal drill hole would be drilled through known techniques, in a proper orientation both vertically and horizontally, so as to effect a continuous horizontal borehole for a predetermined distance.

Unlike FIG. 1, where there are no further boreholes drilled from the horizontal 18, following the drilling of the horizontal borehole 18 in FIG. 2, that borehole would then be lined with a continuous casing of fiberglass 22, which would again be threaded in segments end to end to form the continuous fiberglass casing 22. The principal reason in the preferred embodiment that fiberglass would be utilized is that as will be explained further, when the radial boreholes are drilled from the horizontal borehole, the fiberglass casing 22 makes it quite easy to mill through the fiberglass in forming the radial boreholes.

In FIG. 2, after the horizontal borehole 18 has been lined with the fiberglass casing 22, a first carrier string having an upstock 44 on its lower end is lowered down into the borehole, and properly oriented. At this point, a second drillstring with a drill bit for forming the various radial boreholes is lowered into the carrier string and is located in the horizontal borehole at various distances apart. A first radial borehole is drilled by angling the drill bit off of the upstock, the drillstring is retrieved from the radial borehole and the upstock is moved further into the horizontal borehole to drill the additional radial boreholes in the direction that the upstock is oriented. There is no certain number of radial boreholes that can be drilled off of the horizontal borehole 18, it would depend actually on the length of the cased horizontal borehole 18 and the distance apart with each radial well would be drilled along its length. As further noted in FIG. 2, depending on the thickness of the salt bed 20, additional horizontal boreholes 18 could be drilled as noted in FIGS. 1 and 2, and again, from each horizontal borehole that has been lined with a fiberglass casing 22, a plurality of radial boreholes 24 could be drilled therefrom as depicted in FIG. 2. Of course, the number, in effect, may be limitless depending on the thickness of the salt layer and the number of radial boreholes required.

At this point in the process, the next step would be to dispose the spent nuclear waste down the horizontal boreholes 18 as seen in FIG. 1, or the plurality of radial boreholes 24 as illustrated in FIG. 2. In any case, the disposal steps would be similar. What is provided as seen in sequential views in FIG. 3A, a running string 32, either conventional, or a coiled tubing, is lowered into the carrier string having the upstock 44 in place. At the end of the running string 32 there is positioned a pre-packed liner 28 has been placed and which has been lowered down the vertical borehole 14 into the horizontal borehole 18 in FIG. 1, or into one of the plurality of radial boreholes 24 as illustrated in FIG. 2. In the preferred embodiment, the pre-packed liner 28 with the spent nuclear waste 36 would be a specialized type of liner that would have to be designed or may already be known in the art which is capable of housing a certain quantity of spent nuclear waste within its confines, in an environmental safe manner, and could seal under the hydrostatic pressure forces downhole.

Figure 3B:
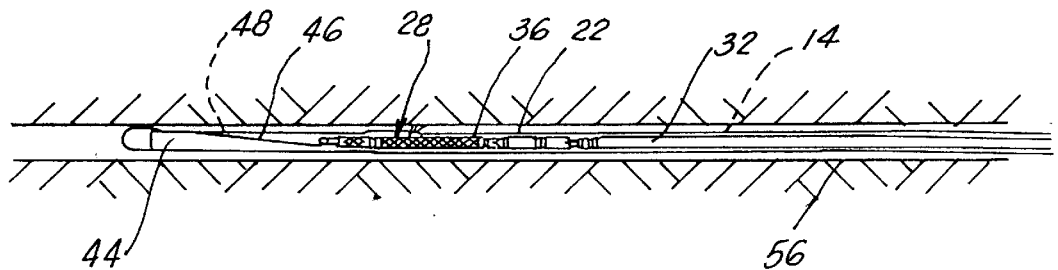
FIGS. 3A through 3E illustrate in a series of views the placement of the nuclear wastes for disposal within the horizonal or radial borehole utilizing the method of the present invention.
Figure 3A:
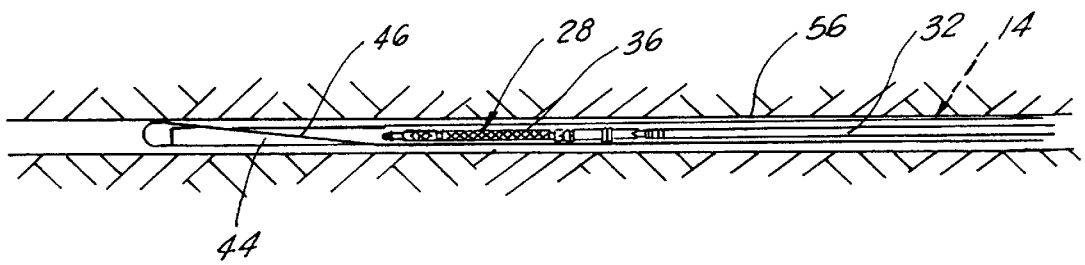
Figure 3E:
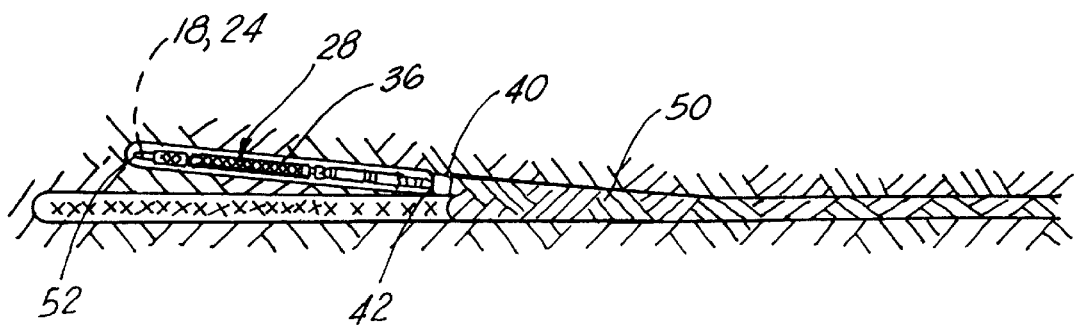

For purposes of construction, the pre-packed liner 28, as illustrated in FIG. 3B, would make contact with the upstock 44- positioned at the end of the carrier string, which would guide the liner 28 containing the waste 36, into the horizonal borehole 18 of FIG. 1, or one of the radial boreholes 24 as seen in FIG. 2. As is known, the upstock 44 includes a guide surface 46 which guides the liner 28 through the window 48 drilled through the fiberglass casing 22, into the angulated borehole either 18 or 24. Next, as seen in FIG. 3C, the liner 28 would be positioned centrally within the horizontal borehole 18, or the radial boreholes 24, via the plurality of centralizers 34 and may be of any particular length, depending on the quantity of spent nuclear waste 36 contained within the liner 28. For example, if the horizontal or radial boreholes would be of length of 100 feet, then one, in theory, could conceivably have a pre-packed liner of substantially that length which could be housed within the borehole 24 as illustrated.

Figure 3D:
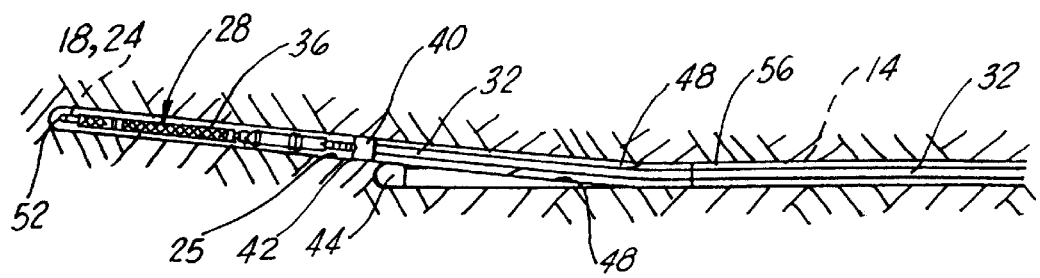
Figure 3C:
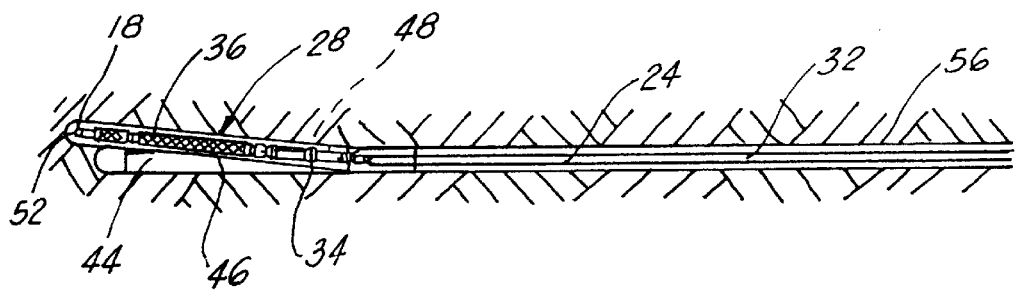

Tuning now to FIG. 3D, the liner is in position within radial borehole 24, or horizontal borehole 18, the running string 32 is still attached to the pre-packed liner 28 and a specialized packer 40 has been set in place at that point where the radial or horizontal borehole angulates out from the principal borehole 14. When the packer 40 and the pre-packed liner 28 would be disengaged from the running string 32, so that the running string 32 may be retrieved from the borehole, and the packer 40 would remain and form a seal 42 around the entire inner wall 25 of radial borehole 24 or horizontal borehole 18 and would, in effect, form the first sealing between the borehole and the pre-packed liner in the system as seen in FIG. 3E. Although this assembly is shown in FIG. 3D as being in place in a single borehole, each of the horizontal boreholes 18, as seen in FIG. 1, or the plurality of radial boreholes 24 as illustrated in FIG. 2, would have such a pre-packed liner 28 with spent nuclear waste 36 in place within the multiple layers of horizontal wells 18 as illustrated, and sealed in place by inflated packer 40.

Next, as further illustrated in FIG. 3E, following the retrieval of the running string 32 and the carrier string 56 out of the horizontal boreholes 18, and after the assembly has been retrieved from the vertical borehole 14, leaving each of the boreholes 18, and 24 housing only the liners 28 containing the nuclear waste sealed within the boreholes by packers 40 for disposal. At this point in the process, after the disposal of the nuclear waste has been completed in the various radial boreholes, and the disposal is complete with each of the radial boreholes sealed by the inflatable packers, horizontal borehole 18 and vertical borehole 14 could then be cemented with cement 50 as the sealing agent, so that the boreholes could be completely sealed with the cement, even to the point of the surface, throughout the length of the initial vertical borehole 14.

Figure 4:
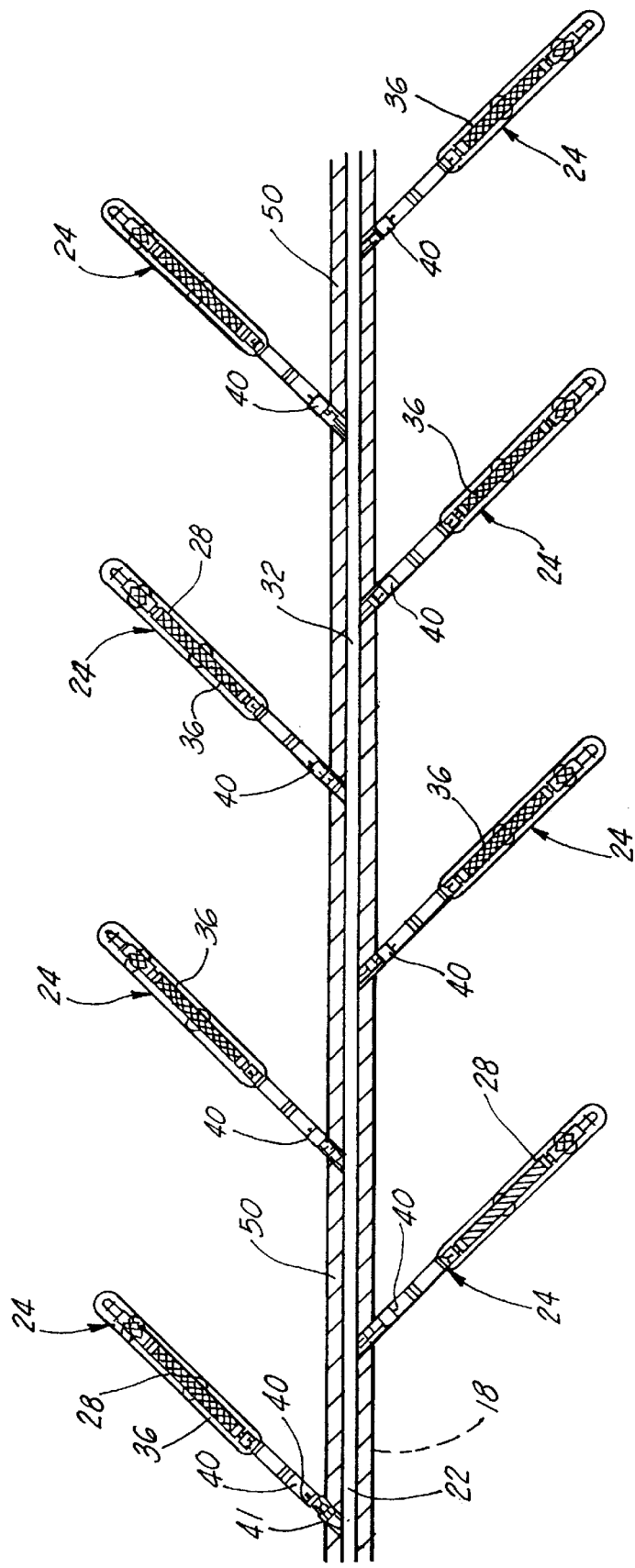
FIG. 4 is an overall view of a plurality of the radial boreholes extending from a horizontal borehole, following the placement of the nuclear waste therein for disposal and the cementing off of the horizontal borehole for safe disposal.
Figure 5:
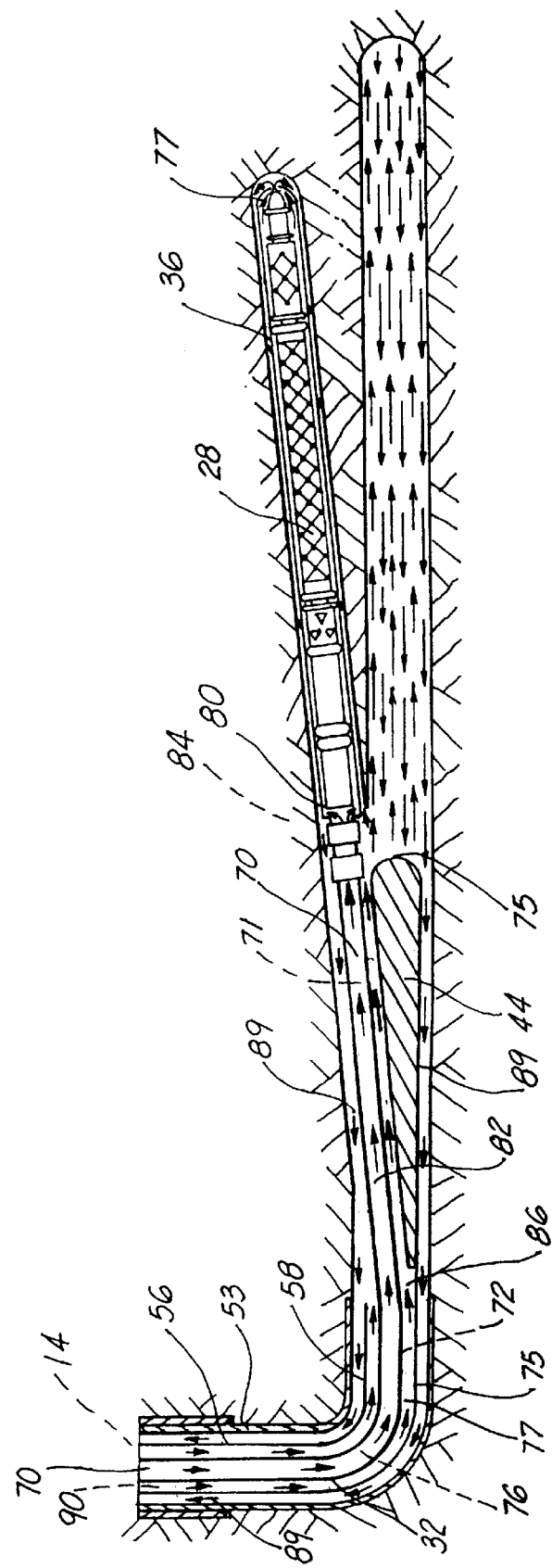
FIG. 5 illustrates an isolated view of the process of disposing of nuclear wastes down a horizontal or radial borehole utilizing the dual circulation two drillstring technique.

Although FIG. 1 illustrates a single vertical well 14, it is imagined that a plurality of vertical wells 14 could be drilled from drilling rig 12 and off of each of the vertical boreholes, a plurality of horizontal boreholes 18 may be drilled and the same type of arrangement be undertaken as was described earlier. As illustrated in FIG. 4, there have been a plurality of radial boreholes 24 drilled off of a horizontal borehole 18. Each radial 24 has been filled with nuclear waste 36, each packer 40 is sealed in place, and cement 50 has been injected into the entire length of the horizontal borehole 18 effectively sealing off the entire network of radials 24 and horizontal well 18, resulting in the complete disposal of the nuclear waste 36 within the network of boreholes illustrated in FIG. 4. Therefore, it is foreseen that as long as there is a sufficient quantity of salt bed 20 in place, this type of a system could be utilized in disposing nuclear waste underground, and is foreseen that the system would be quite cost effective, and environmentally safe in all respects.

In order to carry out the process and method of the present invention in transporting nuclear wastes down a borehole for disposal, one may select a process known as the concentric technique utilizing a dual drill string. Although the disposal of the nuclear waste 36 would be carried out as described in FIGS. 3D and 3E, this process would address the manner in which the nuclear waste 36 are transported down the borehole, which may result in greater safety and reduce the risk of the waste 36 within the liners 28 from overheating which being transported downhole.

In general, as was described earlier, in the process known as concentric drilling technique, there is provided a cased borehole, wherein there is lowered a carrier string having an upstock on its end to a depth which is normally at a depth of at least a section of fiberglass casing. At this point in the technique, an inner drill string 31 is lowered into the carrier string 56 and a radial borehole is drilled off of the angulated surface of the upstock through the wall of the casing for drilling the radial borehole. The drillstring is then retrieved from the borehole with the carrier string with the upstock maintained in place. The next step in the process, the nuclear waste at the end of the running string 32 would be lowered into the radial borehole and set in place.

Therefore, the dual string drilling technique would allow for fluid to circulate which would in turn, maintain the nuclear waste being transported downhole cool. In the process, after the inner drilling assembly has been removed from the carrier string, the liner 28 housing the spent nuclear waste 36 at the end of the running string 32, and is lowered into the carrier string. Fluid, or water, is circulated down the bore 76 of the running string 32 for helping to cool the liner 28 housing the nuclear waste. In illustrating this technique, reference is made to FIG. 5, where there is illustrated a portion of outer casing 53 which would line the vertical borehole 14 from the formation 54. Within the outer casing 53 there is provided a smaller carrier string 56, which may be a 5" casing, which is lowered into the outer casing 53 thus defining a first annulus 58, between the inner wall of the outer casing 53 and the outer wall of the carrier string 56. This annulus 58 would provide a means for returning of cooling fluids for the nuclear wastes 36, as will be described. The carrier string 56 would extend upward to the rig 12 and would receive fluids from the first and second pumps, located on the rig 12 so that fluid is returned within the first annulus 58. Positioned within the carrier string 56 is the running string 32 such as coil tubing 70, which is normally 2" in diameter, and fits easily within the interior of the carrier string 56. It is at the end of the coil tubing 70 where there is positioned the pre-packed liner 28, as described earlier, housing the nuclear waste 36, for disposal. The diameter of the coil tubing 70 and liner 28, would be less than the inner diameter of carrier string 56, therefore defining a second annulus 72 between the wall of the coil tubing 70 and the wall of the carrier string 56. This annulus 72, Pump #1 would provide a means for flowing cooling fluid 75, such as water, downhole while the nuclear waste 36 is being transported by coil tubing 70, or some other type of string. Likewise, the coil tubing 70 has a continuous bore 76 therethrough, so that fluid may be pumped via a second pump through the coil tubing bore 71, but would exit coil tubing 70, at the point of attachment 80 to the pre-packed liner 28.

Therefore, again referring to FIG. 5, there is illustrated a pre-packed liner 28 containing nuclear wastes 36 has been lowered into, for example, down a radial borehole 24, utilizing this technique. As illustrated, there is a first cooling fluid 75, such as water, by arrows 82 which is pumped down the bore 76 of coil tubing 70 and exits via flow ports 84 at the point of connection between coil tubing 70 and liner 28. Likewise, a second fluid 77, again, perhaps being water, by arrows 86 is pumped down second annulus 72 to further cool the area 90 surrounding the coil tubing 70, as it is moved downhole. As illustrated, the first and second fluids, 75, 77, are commingled down the borehole and returned together via first outer annulus 58, arrows 89, previously defined, carrying any excess heat which may have emanated from the nuclear wastes 36 within liner 28.

Utilizing this concentric technique as was stated earlier, there are two principal aims accomplished. First, by pumping fluid down double annuli 72, 76, as described, and returning the commingled fluids up the third outer annular annulus 58, there is heat exchanged from the nuclear waste 36 within the liner 28 into the fluids 75, 77, so that these commingled fluids containing the heat are returned up the third annulus 58 to the rig fluid system. This process of dual flow greatly reduces the possibility of the nuclear waste 36 from overheating during transport downhole for disposal. Secondly, the technique also assures that the hydrostatic pressure within the borehole will be overcome, so that there is a great reduction in the possibility of a potential blowout from the formation, which the wastes are being moved downhole.

Figure 6:
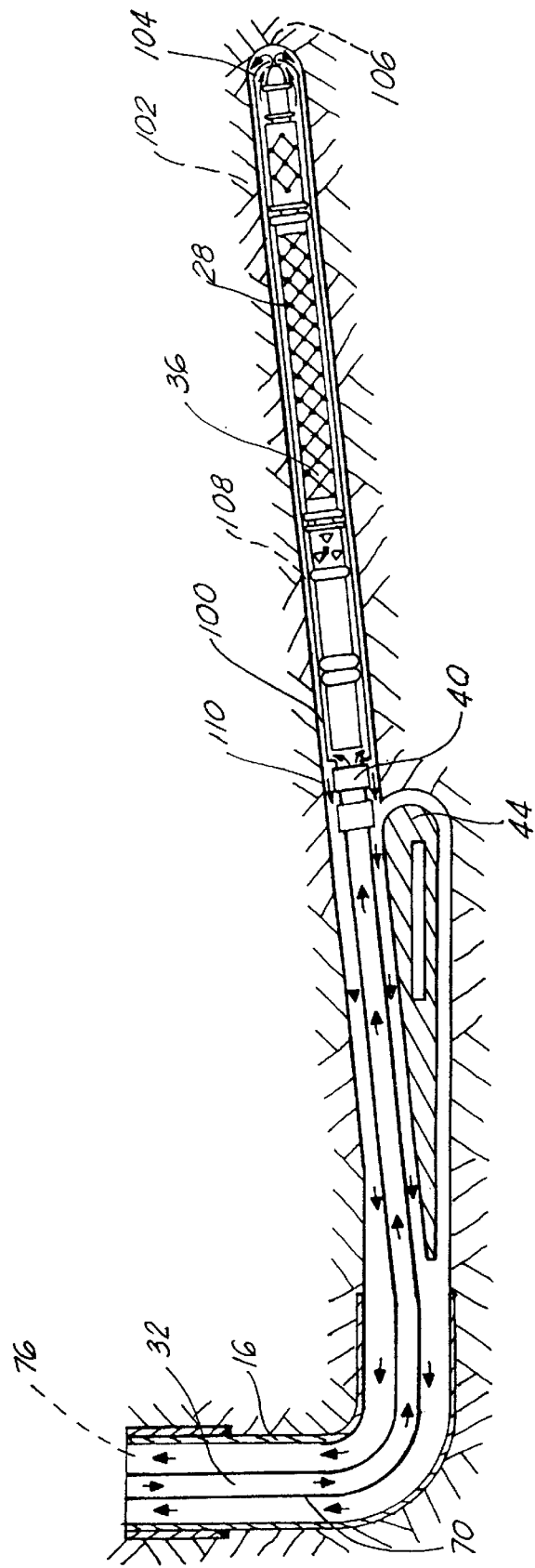
FIG. 6 illustrates an alternative embodiment of the process of the present invention utilizing cooling fluid as a nuclear waste is disposed downhole in a single drillstring technique.
Figure 7:
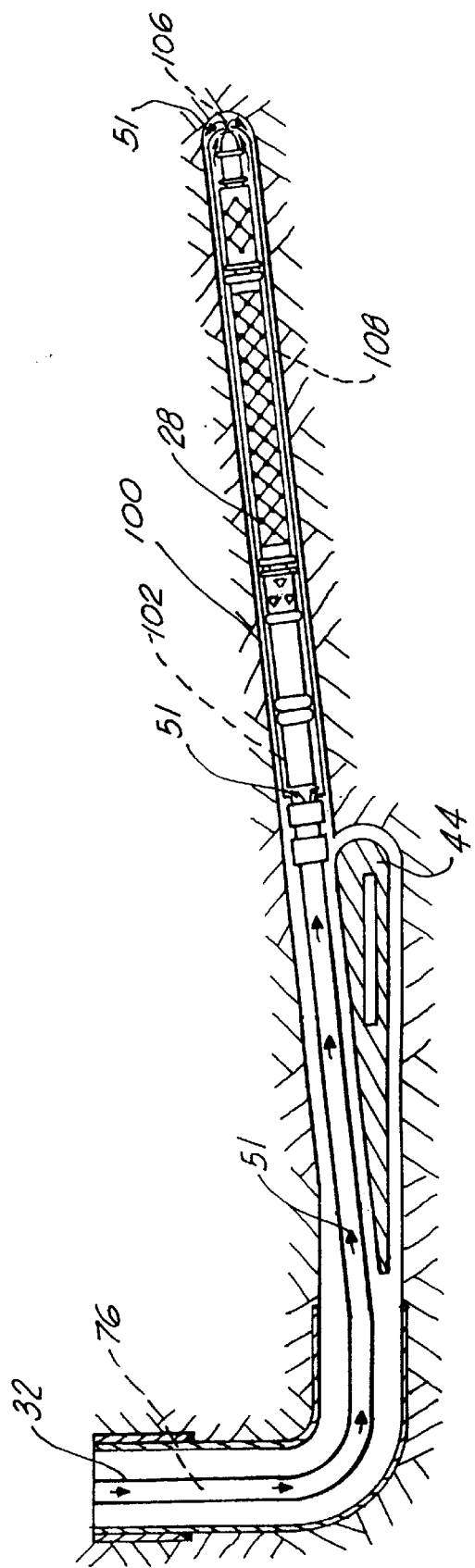
FIG. 7 illustrates in the embodiment in FIG. 6, the pumping of cement down the radial borehole after the liner is in place.
Figure 8:
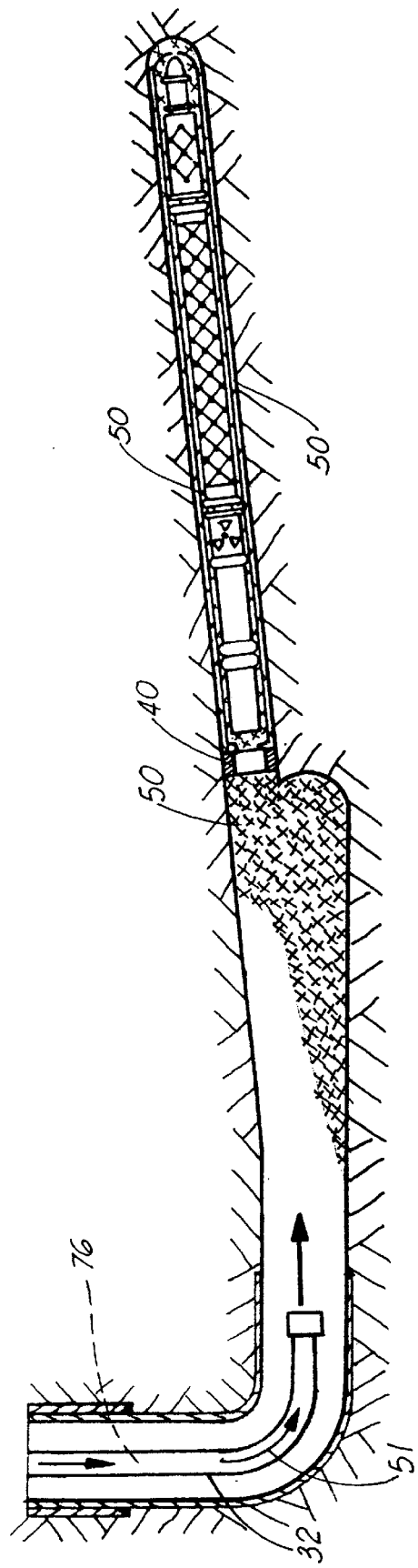
FIG. 8 illustrates in the embodiment in FIG. 6 the detachment of the running string from the nuclear waste disposed and cemented within the radial borehole.

FIGS. 6–8 illustrate an embodiment of the method of disposing of nuclear wastes which could involve the circulation of fluid around the liner as the liner is positioned within a housing for disposal downhole. As illustrated in FIG. 6, a principal borehole has been drilled, and has been cased with casing 16. A carrier string has been lowered down the borehole, and an inner drillstring has been moved into the carrier string and has drilled off of the angulated surface of the upstock for drilling a horizontal or radial borehole off of the principal borehole. Following the retrieval of the drillstring from the carrier string 56, there is illustrated an upstock 44 in position to receive the nuclear waste 36 at the end of a running string 32 such as coiled tubing 70 or the like. Because such a running string 32 includes an inner bore 76 as was described earlier, fluid could be run down the running string bore 76 which could serve as a cooling fluid. However, in this particular embodiment, it is foreseen that the nuclear waste 36, while it would be transported downhole, could be surrounded by cooling fluid. This would be accomplished by placing the nuclear waste 36, as in the principal embodiment, into a pre-packed liner 28, and placing the pre-packed liner 28 within a housing 100 which would therefore define an annulus 102 between the wall of the pre-packed liner and the inner wall of the housing. It is foreseen that the lower end 104 of the housing 100 would have a bore 106 for allowing fluid to flow therethrough. Therefore, as seen in FIG. 6, as fluid is flowing down the inner bore 76 of the running string 32, the fluid would flow past the attachment point of the pre-packed liner 28 to the running string 32 and would continue to flow within the annulus 102 defined between the wall of the pre-packed liner and the wall of the housing.

As fluid would flow passed the pre-packed liner, it would pick up heat which would be generated by the nuclear waste 36. This fluid would then flow out of the lower bore 106 in the housing, and would be returned up the annular space 108 between the housing and the wall of the casing 16 as seen by arrows 110.

Therefore, during the entire process of moving the nuclear waste downhole, moving it in place and prior to sealing off the nuclear waste with the inflatable packer 40, fluid could be continuously run between the nuclear waste and the housing and the fluid containing the heat from the nuclear waste would be returned up the annular space of the carrier string for being cooled and re-pumped downhole.

A further benefit of this particular technique is following the placement of the nuclear waste within the radial borehole as illustrated in FIG. 7, and after the inflating of the packer 40, when the housing is in place within the radial borehole, cement (arrows 51) could be pumped down the bore 76 of the running string 32. The cement would then move into the annular space 102 between the pre-packed liner 28 and the housing 100, out through the lower bore 106 in the housing and would then fill the annular space between the housing 100 and the inner wall of the radial borehole.

As seen in FIG. 8, once the radial borehole is filled with cement 50, and the radial borehole containing the nuclear waste would be filled with cement 50 in the annular spaces 106, 108 between the liner and the housing and the wall of the radial borehole. Thus, even after the pre-packed liner 28 has been detached from the running string 32, and the carrier string with the upstock 44 on its end have been retrieved, the running string 32 would gain be run into the wellbore, could continue to pump cement (arrow 51) into the principal borehole. In this particular embodiment, therefore, not only would there be cement in the principal borehole, but there would be cement 50 within the radial borehole surrounding the pre-packed liner which would be an additional isolation of the nuclear waste that is being disposed of downhole.

Of course, like the simpler technique described earlier, the concentric technique provides that once the horizontal boreholes 18, or radial boreholes 24 have been sealed off by packers 40, the boreholes are then sealed with cement in the same manner to provide a safe and complete disposal of nuclear wastes.

Although the specification has addressed the safe disposal of nuclear waste down boreholes, it is foreseen that this process and method would apply to any type of waste material which may be a potential hazard to our environment. For example, weapons such as bombs or other types of containers which are currently being stored which were to be utilized in the event as a weapon in chemical warfare, could be disposed of in the similar fashion as was described in the disposal of nuclear waste. The disposal of the containers of chemical weapons within boreholes bored through salt beds, would be an effective way to isolate these wastes from the environment. This would also apply to other types of hazardous wastes in the environment including biomedical waste or other type of waste.

PARTS LIST

The following is a list of suitable parts and materials for the various elements of the preferred embodiment of the present invention.

| PARTS LIST | |
|---|---|
| Description | Number |
| system | 10 |
| drilling rig | 12 |
| surface | 13 |
| vertical bore hole | 14 |
| earth | 15 |
| steel casing | 16 |
| horizontal borehole | 18 |

-continued

PARTS LIST

| Description | Number |
| --- | --- |
| point | 19 |
| salt bed | 20 |
| fiberglass casing | 22 |
| wall | 23 |
| radial boreholes | 24 |
| inner wall | 25 |
| length | 26 |
| pre-packed liner | 28 |
| end | 30 |
| inner drill string | 31 |
| running string | 32 |
| centralizers | 34 |
| nuclear waste | 36 |
| rear end | 38 |
| packer | 40 |
| entry way | 41 |
| seal | 42 |
| upstock | 44 |
| guide surface | 46 |
| window | 48 |
| cement | 50 |
| arrows | 51 |
| end point | 52 |
| outer casing | 53 |
| formation | 54 |
| carrier string | 56 |
| first annulus | 58 |
| first layer | 60 |
| coil tubing | 70 |
| second annulus | 72 |
| first fluid | 75 |
| bore | 76 |
| second fluid | 77 |
| attachment point | 80 |
| arrows | 82 |
| bore | 76 |
| flow parts | 84 |
| arrows | 86, 89 |
| area | 90 |
| housing | 100 |
| annulus | 102 |
| lower end | 104 |
| lower bore | 106 |
| annular space | 108 |
| arrows | 110 |

The foregoing embodiments are presented by way of example only; the scope of the present invention is to be limited only by the following claims.

I claim:

1. A system for disposing of hazardous waste underground, comprising:
   a) a borehole having a first portion drilled to a certain depth within the earth;
   b) at least a second portion of the borehole angularly extending from the first portion a predetermined distance from the first portion of the borehole;
   c) a sealed liner containing a quantity of hazardous wastes deposited into the second portion of the borehole; and
   d) means for sealing off the second portion of the borehole containing the hazardous wastes from the first portion of the borehole.

2. The system in claim 1, wherein the hazardous waste disposed of would comprise nuclear waste, chemical warfare waste, biomedical waste, and other waste potentially hazardous to the environment.

3. The system in claim 1, further comprising additional angulated portions of the borehole drilled off of the first portion of the borehole.

4. The system in claim 1, further comprising an easily, drillable casing such as fiberglass, comprising at least that portion of wall of the borehole from which the second portion of the borehole is formed.

5. The system in claim 1, further comprising a drillstring having a drill bit for lowering down the first portion of the borehole and drilling the second portion of the borehole.

6. The system in claim 1, further comprising a running string for lowering down the sealed liner into the second portion of the borehole.

7. The system in claim 1, wherein the first portion of the borehole comprises a vertical borehole, and the second portion of the borehole comprises a horizontal borehole drilled off of the horizontal borehole.

8. The system in claim 1 wherein the means for sealing off the second portion of the borehole containing the nuclear wastes comprises an inflatable packer which seals against the wall of the second portion of the borehole.

9. A method of disposing of nuclear waste underground comprising the following steps:
   a) drilling a first portion of a borehole to a depth in an underground impermeable formation;
   b) drilling a second portion of the borehole, the second portion angularly extending away from the first portion of the borehole;
   c) lowering a quantity of nuclear wastes sealed within a liner into the second portion of the borehole;
   d) sealing off the first portion of the borehole from the second portion of the borehole containing the nuclear wastes.

10. The method in claim 9 wherein the underground impermeable formation may further comprise a salt bed, granite, or any formation without fractures therein.

11. The method in claim 9, further comprising the steps of drilling additional angulated boreholes, the quantity limited only the availability of space within the salt bed.

12. The method in claim 9, wherein the liner containing the nuclear waste is constructed of material which seals against hydrostatic pressure down the borehole.

13. The method in claim 9, wherein the first portion of the borehole is drilled with a first drill string.

14. The process in claim 9, wherein the second portion of the borehole is drilled with a second drill string through the wall of the first portion of the borehole.

15. A method of disposing of nuclear waste underground, the method comprising the following steps:
   a) drilling a first portion of a borehole to a depth into an impermeable formation;
   b) drilling a second portion of the borehole, the second portion angularly extending away from the first portion of the borehole;
   c) lowering a quantity of nuclear wastes on the end of a running string sealed within a liner into the second portion of the borehole;
   d) circulating a fluid between the wall of the first and second boreholes and the running string to maintain the nuclear wastes at a safe temperature down the borehole;
   e) disposing of the nuclear waste sealed within the liner in the second portion of the borehole; and
   f) sealing off the first portion of the borehole from the second portion of the borehole containing the disposed nuclear wastes.

16. The method in claim 15, wherein the first portion of the borehole comprises a horizontal borehole, and wherein the second portion of the borehole comprises at least one radial borehole drilled from the wall of the horizontal borehole.

17. The process in claim 15, wherein the first borehole is lined with a casing.

18. The process in claim 15, wherein the running string comprises coil tubing having a flowbore therethrough.

19. The process in claim 15, wherein there is drilled a plurality of radial boreholes from the horizontal borehole, so that each radial borehole may house a quantity of spent nuclear wastes packed off from the horizontal borehole isolating each quantity of nuclear waste when the horizontal borehole is cemented off.

20. The process in claim 15, wherein the fluid circulated in the annulus formed between the wall of the running string and the wall of the carrier string comprises fluid for receiving heat from the nuclear waste being transported down the borehole.

21. A method of disposing of nuclear wastes down a borehole, comprising the following steps:

a) drilling a principal borehole;

b) lowering a carrier string within the principal borehole to a predetermined depth, the carrier string having an upstock properly oriented on its end;

c) lowering a second drillstring within an annulus formed by the carrier string which angulates outward from the upstock at the end of the carrier string and forms a second radial or horizontal borehole;

d) removing the drillstring from the annulus of the carrier string;

e) lowering a running string within the bore of the carrier string, the running string having a sealed quantity of nuclear waste at the end of the running string for depositing into the angulated horizontal or radial boreholes;

f) flowing a first fluid down the bore of the running string for cooling the nuclear waste at the end of the running string;

g) flowing a second fluid down the annulus formed between the running string and the carrier string to further cool the nuclear waste;

h) merging the first and second fluids at the end of the carrier string and returning the heated fluid up the annulus formed between the carrier string and the cased borehole;

i) depositing the nuclear waste within the horizontal or radial borehole; and j) sealing off the horizontal or radial borehole containing the nuclear waste from the first borehole.

22. The method in claim 21 further repeating steps b) through j) along the length of the first borehole.

23. The method in claim 21, wherein the first and second fluids comprise water.

24. The method in claim 21, wherein the wall of the first borehole is lined with a metal casing with at least a section of the borehole lined with a fiberglass casing.

25. The method in claim 21, wherein following the step of cementing the radial borehole, the carrier string with the upstock is retrieved from the principal borehole and the principal borehole is cemented up to the surface.

26. The method in claim 21, wherein the running string which delivers the nuclear wastes downhole has a diameter smaller than the diameter of the carrier string, defining a second annulus between the carrier string and the running string.

27. The method in claim 21 wherein the running string comprises coiled tubing which has a fluid flow bore therethrough.

28. A method for cooling nuclear waste which is being disposed down a borehole whereby a principal borehole has been drilled; the principal borehole has been lined with casing, a portion of which is fiberglass casing; a carrier string having a retrievable upstock on its end portion has been lowered into the principal borehole at a predetermined depth and properly oriented therein; a second drillstring has been lowered into the bore of the carrier string and whereby a horizontal or radial borehole has been drilled through the wall of the casing lining the principal borehole at an angle from the orientation of the principal borehole; the second drillstring has been retrieved from the borehole, so that the borehole is ready to receive spent nuclear waste, the method of cooling the nuclear waste comprising the following steps:

a) lowering a quantity of disposed nuclear waste within a pre-packed liner positioned at the end of a running string, of the type having a bore therethrough, the nuclear waste being lowered into the bore of the carrier string in position within the principal borehole;

b) while the nuclear waste is being lowered down the borehole, flowing a first cooling fluid down the bore of the running string;

c) simultaneously flowing a second cooling fluid in the annulus between the running string and the carrier string so that fluid is surrounding the nuclear waste while it is being lowered downhole;

d) merging the first and second fluids downhole which contains heat from the nuclear waste and returning the first and second fluids up to the surface via the annulus between the carrier string and the cased borehole;

e) placing the nuclear waste within the horizontal or radial borehole and sealing off the radial borehole with an inflatable packer;

f) retrieving the running string and the carrier string with the upstock from the principal borehole and flowing cement within the borehole for cement off at least a portion of the principal borehole from the radial borehole.

29. The method in claim 28, wherein the fluids receive the heat from the nuclear wastes and are returned to the surface.

30. The method in claim 28, wherein the fluid comprises water or other cooling fluid.

31. The method in claim 28, wherein the step of sealing off the second borehole comprises pumping cement down the borehole to seal the entrance to the second borehole.

32. A method of cooling nuclear waste being transported for disposal down a borehole comprising the following steps:

a) providing a principal cased borehole;

b) drilling a radial borehole off of the principal borehole;

c) providing spent nuclear waste within a housing secured to the end of a running string;

d) lowering the nuclear waste down the radial borehole at the end of the running string;

e) flowing a fluid into the bore of the running string and allowing the fluid to flow through an annular space formed between the nuclear waste and the housing so that the fluid surrounds the nuclear waste as it is being transported downhole;

f) providing a bore in the housing for allowing the fluid flowing in the housing to flow out of the housing and to be returned up the borehole in the annular space formed between the running string and the wall of the borehole.

33. The method in claim 32, wherein the running string is lowered downhole in the bore of a carrier string having an upstock on its end so as to guide the nuclear waste into the radial borehole at a predetermined depth down the principal borehole.

34. The method in claim 32, wherein the nuclear waste would be housed within a pre-packed liner so that the pre-packed liner is in turn positioned within a housing and there is defined an annular space between the housing and the pre-packed liner where the fluid flows therethrough for cooling the nuclear waste.

* * * * *